United States Patent
Mitina et al.

(10) Patent No.: US 8,568,834 B2
(45) Date of Patent: Oct. 29, 2013

(54) SUPERHYDROPHILIC COATING COMPOSITIONS AND THEIR PREPARATION

(75) Inventors: Valentina Mitina, Tarrytown, NY (US); Michael Chin, Oakland Gardens, NY (US); Keqing Fa, Ardsley, NY (US); Thomas Giesenberg, Oberwil (CH)

(73) Assignee: BASF SE, Ludwigshafen (DE)

( * ) Notice: Subject to any disclaimer, the term of this patent is extended or adjusted under 35 U.S.C. 154(b) by 1184 days.

(21) Appl. No.: 12/321,542

(22) Filed: Jan. 22, 2009

(65) Prior Publication Data

US 2009/0246536 A1   Oct. 1, 2009

Related U.S. Application Data

(60) Provisional application No. 61/062,155, filed on Jan. 24, 2008.

(51) Int. Cl.
  *B05D 5/00*  (2006.01)

(52) U.S. Cl.
  CPC ........................................ *B05D 5/00* (2013.01)
  USPC ...................................................... 427/419.2

(58) Field of Classification Search
  CPC ........................................................ B05D 5/00
  USPC ................. 427/180, 202, 407.1, 419.2, 372.2
  See application file for complete search history.

(56) References Cited

U.S. PATENT DOCUMENTS

| | | | |
|---|---|---|---|
| 5,208,111 A | 5/1993 | Decher et al. | |
| 5,518,767 A | 5/1996 | Rubner et al. | |
| 6,013,372 A | 1/2000 | Hayakawa et al. | |
| 6,641,870 B2 | 11/2003 | Bartkowiak et al. | |
| 6,811,884 B2 | 11/2004 | Goodwin et al. | |
| 7,122,599 B2 | 10/2006 | Haubennestel et al. | |
| 2004/0127393 A1 | 7/2004 | Valpey et al. | |
| 2008/0248281 A1* | 10/2008 | Nakaguma et al. | 428/312.8 |
| 2008/0268229 A1* | 10/2008 | Lee et al. | 428/323 |

FOREIGN PATENT DOCUMENTS

| | | |
|---|---|---|
| WO | 2007068870 | 6/2007 |
| WO | 2008021817 | 2/2008 |

OTHER PUBLICATIONS

International Search Report dated Jun. 4, 2009.
Zhang, et al. "Self-cleaning particle coating with antireflection properties" Chem. Mater. vol. 17, Jan. 14, 2005 pp. 696-700, XP008101432.

* cited by examiner

*Primary Examiner* — William Phillip Fletcher, III
(74) *Attorney, Agent, or Firm* — Shiela A. Loggins

(57) ABSTRACT

A method is provided for preparing on the surface of a substrate a superhydrophilic layer containing at least one metal oxide which method comprises calcining at elevated temperatures a cross-linked precursor film in which film the metal oxide is evenly distributed and immobilized. The precursor film is prepared by sequentially applying to the surface of the substrate a polyamine or other cationic polymer, a suspension of metal oxide and then a suitable cross linking agent. The superhydrophilic layer can be applied as a coating to a variety of substrates including metal, glass and ceramic and provides excellent dirt resistance, scratch resistance and antifogging effect. Multi-layer systems are also available using the inventive process.

11 Claims, No Drawings

SUPERHYDROPHILIC COATING COMPOSITIONS AND THEIR PREPARATION

This application claims benefit under 35 USC 119(e) of U.S. provisional application No. 61/062,155, filed Jan. 24, 2008.

A method is provided for preparing on the surface of a substrate, such as a glass or ceramic substrate, a superhydrophilic layer containing at least one metal oxide. The method comprises calcining at elevated temperatures a cross-linked precursor film in which film the metal oxide is evenly distributed and immobilized. The precursor film is a single layer film prepared by first applying to the surface of the substrate a polyamine or other cationic polymer, followed by application of a suspension of metal oxide and then cross linking with a suitable agent such as an aldehyde cross linking agent.

Calcining the precursor film results in a metal oxide monolayer with a smooth surface at the nanoscale, as observed by atomic force microscopy. The superhydrophilic coating layer can be applied to a variety of substrates including metal, glass and ceramic and provides excellent dirt resistance, scratch resistance and antifogging effect. Multi-layer systems are also available using the inventive process.

BACKGROUND

The surface characteristics of a substrate can be altered by a variety of means, perhaps most readily by the application of a coating layer. For example, the frictional properties or adhesive properties of materials can be modified, depending on the desired use of the materials, by suitable treatment of their surface. A number of methods for altering the surface properties of polymeric biomaterials, such as contact lenses, and for coating electronic devices have also been developed. Water repellant, oil repellent, stain resistant, anti-microbial, anti-static, anti-fog, anti-scratch and water absorptive surface treatments and coatings are well known commercial products.

U.S. Pat. No. 7,122,599, incorporated herein in its entirety by reference, discloses coating compositions and polymeric molding compounds having anti-adhesion and dirt repellency properties. The compositions contain as an additive a branched polymer which comprises a polymeric base molecule and polydiorganosiloxane side chains which are bonded covalently to the base molecule via Si—C bonds.

U.S. Pat. No. 6,641,870, incorporated herein in its entirety by reference, discloses a process for producing a coating, i.e., an ink or paint or a pollutant, bioorganism, oil, water and/or dirt repellent coating, on a substrate, which process comprises first applying to a substrate a composition which includes one or more organosilicon components to obtain a treated substrate and subsequently applying at least one organosiloxane (i) which carries at least one select triamino group or a composition which includes at least one organosiloxane (i), to the treated substrate. Said coating provides protection against water-transported pollutants and furnishes the substrate with anti-graffiti properties.

U.S. Pat. No. 6,811,884 incorporated herein in its entirety by reference, discloses a method for applying a water repellant coating over a substrate surface wherein the surface is contacted with at least one coating composition comprising at least one perfluoroalkylalkylsilane, at least one hydrolyzable primer, e.g., a silane and/or siloxane, and at least one non-halogenated, e.g., non-fluorinated, alkylsilane.

In many cases it is important for both economic and performance reasons to produce thin, defect-free, mono- or multi-layer coatings. It is also desirable that the layers are durable under the conditions where the coated substrate is used.

There are several known methods for the preparation of ultra thin mono- and multi-layered films including solution casting, Langmuir-Blodgett technique and various chemisorption techniques. While each method has advantages, there are also disadvantages when a particular method is used in certain applications. For example, solution casting of preformed bilayer aggregates and annealing of spin coated films of copolymers yields layered structures, but the alignment of the layers and the positioning of molecules with respect to each other is limited. Chemisorption methods typically require exacting conditions and often multiple chemical reactions.

U.S. Pat. No. 5,208,111, incorporated herein in its entirety by reference, discloses a method for applying one- or multi-layered layer elements to supports via the alternating deposition of polycations and polyanions. For example, a positively charged glass substrate is first created by suitable silane chemistry, then immersed into a dilute solution of a polyanion which is then immersed in a dilute solution of a polycation. Repetition of this cycle produces a multilayer thin film comprised of alternating layers of polycations and polyanions wherein the thickness and conformation of each polymer layer is determined by the chemistry and concentration of the depositing solution.

U.S. Pat. No. 5,518,767, incorporated herein in its entirety by reference, discloses a molecular self-assembly process based on the alternating deposition of a p-type doped electrically conductive polycationic polymer and a conjugated or nonconjugated polyanion similar to U.S. Pat. No. 5,208,111. In this process, multilayer thin films are prepared by alternating the deposition of a monolayer of an electrically conductive polymer with the deposition of polyanion layer from dilute solutions. Multilayer thin films are obtained by repeating the process. In contrast to a deposition process involving the alternate self-assembly of polycations and polyanions, this process is driven by the electrostatic attractions developed between the p-type doped conducting polymer and the polyanion.

Many of these coating methods, in particular for coating glass and ceramics, require complex and time-consuming pretreatment of the substrate to produce a surface having a highly charged, hydrophilic, or hydrophobic nature in order to bind the polycationic or polyanionic material to the glass substrate.

In preparing coatings comprising inorganic particles, such as metal oxide nano-particles, it is desirable that the particles are evenly dispersed over the surface without particle agglomeration. Organic materials, such as the polymers found in the art cited above, can also be used to prepare coating layers comprising evenly dispersed inorganic particles using the techniques described therein, including the sequential application and self assembly of materials from different solutions and suspensions. Direct vapor deposition of inorganic particles is often encountered in the application of coating layers consisting predominately or exclusively of inorganic materials, such as layers of metal and/or metal oxide nanoparticles.

Improved methods are still needed for the preparation of high quality, durable, metal oxide layers on substrates such as glass or ceramics. It has been found that coatings of evenly dispersed metal oxides can be conveniently prepared on a variety of substrates including glass and ceramics without the use of specialized equipment.

A simple, inexpensive and versatile method has been discovered which allows for control of the thickness of metal oxide layer and reproducibly provides metal oxide layers with excellent surface characteristics. The method makes use of simple, known coating techniques to prepare a metal oxide/organic polymer precursor coating layer on the substrate which is then converted by calcining to a high quality layer of predominately or exclusively metal oxide. Hydrophilic surface layers, which are often scratch resistant, stain resistant and easy to clean, are thus produced on non-hydrophilic substrates.

SUMMARY OF THE INVENTION

A robust, smooth coating layer comprising uniformly dispersed metal oxides is readily prepared over a variety of substrates including metal, glass and ceramics by calcining a precursor coating layer or film which comprises metal oxide nano-particles and a cross linked organic binder. The precursor film is prepared by a simple process involving the sequential application of first a) a cationic polymer such as a polyamine, for example, a poly allyl amine, polyethyleneimine etc, or a cationic polysaccharide, then b) a suspension of one or more metal oxides and then c) a cross linking agent such as a dialdehyde, for example, gluteraldehyde. After the precursor film is dried, calcining the coated substrate at elevated temperatures decomposes the organic binder and sinters the metal oxide particles leaving a uniformly dispersed or nearly uniformly dispersed coating layer of metal oxide.

The present method for preparing a metal oxide layer on a substrate is simple and inexpensive and is readily used to prepare a single nano-scale metal oxide layer with full coverage of a substrate's surface. The method is also flexible in that the steps a) through c) can be carried out using a variety of application methods. Excellent results are achieved, for example, by either by dipping the substrate into a solution or suspension of the polymer, metal oxide or cross linker or by spraying the solution or suspension onto the substrate.

The coating layers of the invention, typically metal oxide mono-layers, are reproducibly thin with a low energy surface rendering the layers hydrophilic. Full coverage of the substrate surface with the metal oxide layer is readily obtained. These hydrophilic coating layers are dirt and stain resistant, scratch resistant, provide anti-fog properties to, for example, glass substrates, and can be further coated if desired.

Another aspect of the invention provides the cross linked precursor coating on a glass or ceramic substrate and the composite material obtained by calcining the thus coated substrate.

Further embodiments of the invention provide a metal oxide layer which is, transparent or substantially transparent, colorless, acid resistant and/or base resistant, and which layer typically has excellent mechanical stability.

DESCRIPTION OF THE INVENTION

A method is provided for preparing a superhydrophilic layer on a substrate which method comprises:
(a) first coating the substrate with a cationic polymer, which cationic polymer is, for example, a polyamine, such as a polyallyl amine, polyethylenimmine etc, or a positively charged polysaccharide, such as polylysine, an aminoagar, or chitosan; followed by
(b) applying to the substrate coated by the cationic polymer, a suspension in a suitable solvent of particles of one or more metal oxides selected from the group consisting of oxides of silicon, zinc and titanium, for example $SiO_2$, ZnO, and $TiO_2$, wherein the particles have a particle diameter of from about 20 nm to about 80 nm, for example, 20 to about 60 nm, for example 40 to about 70 nm, to form a single layer film;
(c) cross linking the thus obtained single layer film by applying a suitable cross linking agent, such as a dialdehyde, for example glutaric dialdehyde, and then drying to obtain a precursor film; and then
(d) calcining the precursor film at elevated temperatures, for example, calcining the precursor film by heating at temperatures of from about 400° C. to about 600° C., for example from about 400° C. to about 500° C., for example from about 450° C. to about 475° C., for about 1 to 8 hours, for example 2-6 hours, for example, calcining the precursor film at about 450° C. to about 475° C. for about 4 hrs.

Calcination step d) decomposes and eliminates the organic portion, also referred to herein as the organic binder, of the precursor layer and sinters the metal oxide particles to a form a uniform or nearly uniform, coherent layer of metal oxide firmly adhered to the surface of the substrate. Elimination of the materials comprising the organic binder, or decomposition products derived therefrom, may not always be absolute, but in an important embodiment of the invention, elimination of the binder material is complete or the amounts of any of these remaining materials are negligible.

The layer produced by the process is surprisingly uniform. Although not wishing to be bound by theory, it is believed that the cross linked organic binder prepared during the above process provides a single layer made up of a three-dimensional lattice enclosing the metal oxide particles which prevents or minimizes agglomeration or aggregation of the metal oxide particles during drying or during calcination. This structured precursor layer then would allow one to achieve a better quality of coating than would be otherwise obtained. In order to minimize the agglomeration, one embodiment comprises a one time dipping process of the substrate to be coated into the polymer solution and metal oxide suspension followed by a final treatment with glutaraldehyde solution as shown in the Examples. The reaction of free amino-groups of polyallylamine with aldehyde-groups of glutaraldehyde leads to the three-dimensional lattice enclosing silica particles.

Excellent results are therefore achieved when the precursor layer is calcined at temperatures below the softening point of the cross linked binder.

For example, the calcination of the substrate coated with the precursor layer containing silicon dioxide and/or titanium dioxide particles occurs at a temperature less than the precursor layer softening point to bond said particles to said substrate and to sinter said particles with each other to thereby form, for example, a photo reactive coating comprising sintered particles of titania and silica.

The present methods therefore provides, for example, a low energy, nanoscale, hydrophilic layer of one or more uniformly dispersed metal oxides with good water wettability, for example, a contact angle with water of about 20 degrees or less, for example 10 degrees or less. For example, the hydrophilic layer of the invention has a contact angle with water of about 5 degrees or less after the full decomposition of the organic binder during the calcination.

As stated, the first step of the present process involves coating a substrate with a cationic polymer. By 'cationic polymer' is meant a polymer known in the art to have a number of positively charged groups along a polymer chain. This does not mean that all potential cites for the formation of a cation are in fact cationic, for example, a polyamine need not have every amino group positively charged, however, a enough amine groups in a polyamine will be protonated or alkylated etc so that the polymer behaves as desired. Such cationic polymers include, but are not limited to: poly(allylamine), poly(allylamine hydrochloride), poly(ethyleneimine) (PEI), poly(vinylbenzyltriamethylamine) (PVBT), polyaniline (PAN or PANI) (p-type doped) [or sulphonated polyaniline], polypyrrole (PPY), polylysine, and certain polysaccharides, such as amino-agar, e.g., amino agrose shown below and chitosan, a linear polysaccharide composed of randomly distributed β-(1-4)-linked D-glucosamine (deacetylated unit) and N-acetyl-D-glucosamine (acetylated unit).

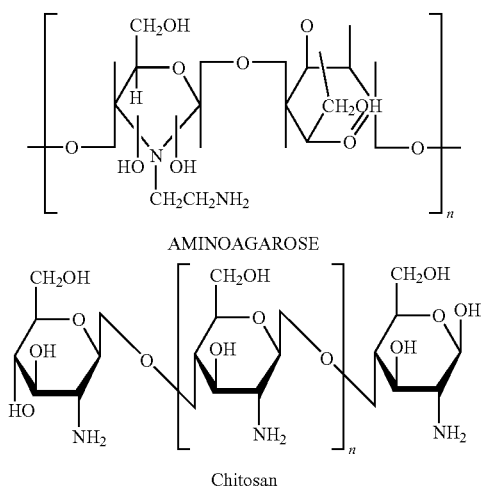

The metal oxides of the invention are typically amorphous nano-particles of oxides of silicon, titanium or zinc, for example, amorphous nano-particles of silicon dioxide, titanium dioxide or zinc oxide. Rutile or anatase titanium dioxide may be employed, in one embodiment, a layer of anatase titanium dioxide is formed.

The metal oxide particles are applied to the substrate in suspensions in any suitable solvent. The suspensions typically contain between 1.0-0.01 wt % of metal oxide which can be conveniently prepared by diluting a known weight % of a commercial metal oxide nanoparticle suspension. Micro emulsions of metal oxides may also be prepared as described in the examples. The concentration of metal oxide in the suspension can effect the thickness of the metal oxide layer deposited and the use of greater of lesser concentrations is envisioned, but the stated range is most often suitable.

Combinations of two or more metal oxides may also be incorporated, either into a single coating layer or a layer of one metal oxide may be formed on top of a layer of a different metal oxide. For example, step b) may consist of applying two or more different metal oxides in a single suspension to the coated substrate produced in step a), or two different suspensions, each comprising a different metal oxide may be applied sequentially.

When sequentially applying two or more different suspensions of metal oxide to the substrate, a calcination step may be employed between the application of each metal oxide suspension, or a single calcination may be employed after all of the individual suspensions have been applied.

For example, a silicon dioxide/titanium dioxide multilayer may be prepared on the surface of a substrate by preparing a first silicon dioxide layer on the substrate by following all steps a) through d) and then, after the calcination, preparing a titanium dioxide layer on top of the first layer via application of a titanium oxide suspension and calcination.

Alternately, steps a) through c) above can be employed to prepare a cross linked precursor layer containing silicon dioxide particles upon which precursor layer is prepared a second precursor layer comprising titanium dioxide after which a single calcination step is carried out.

The substrate can be any solid material stable to the processing conditions including metal, thermally stable plastics, glass and ceramics. For example, the surface of glass or ceramic substrates are treated by the process of the invention to provide glass or ceramic substrates with low energy surfaces comprising metal oxides which are hydrophilic, oil resistant and easy to clean.

The solvents used for preparing solutions or suspensions of the cationic polymer, metal oxide and cross linking agent applied during the practice of the method can be any solvent commonly encountered in coatings technology and compatible with the materials being used, for example, water, alcohols, glycols, esters, ethers, ketones, amides, hydrocarbons, aromatic solvents, halogenated solvents etc.

Methods for coating very small particles with metal oxides to produce, for example, inorganic effect pigments, are known. The present invention however, is readily applied to larger substrates as evidenced by the properties imparted, e.g., soil resistance, and by the examples. Indeed there is almost no practical limit to the size or shape of the substrate which can be coated according to the present method.

In one embodiment of the invention, the hydrophilic layer produced by the method of the invention contains a photoactive, photo activated or photo catalytic metal oxide. For example, the layer contains a photoactive metal oxide selected from the group consisting of titanium dioxide, such as anatase titanium dioxide, and zinc oxide. In some cases, as with zinc oxide, the hydrophilic layer protects the underlying substrate from the deleterious effects of sunlight.

In another embodiment, the surface of a hydrophilic layer prepared according to the invention is further coated with a photoactive or photo catalytic metal oxide layer, for example, titanium dioxide or zinc oxide, for example a photo catalytic layer which comprises the anatase form of titanium dioxide. The further coating layers may be applied using any known technology, but in a particular embodiment, the process of the invention is used to apply the further coating layer.

The possible interaction with light with certain of the layers provides interesting effects. For example, it is known that the photo activity of certain metal oxides, when present in surface, will aid in making the surface self cleaning or easy to clean by catalyzing photo reactions with adhered contaminants on the surface, such as stains. One particular embodiment of the invention provides a composite material produced by the method herein wherein, following irradiation with UV light for 1 day, the surface of said composite is hydrophilic such that it has a water wettability of less than about 10 degrees in terms of the contact angle with water regardless of how long the sample was kept in the dark prior to said irradiation.

The present invention provides a method for modifying the surface of a substrate by incorporating a layer of hydrophilic metal oxides. This layer may be considered a coating layer adhered to a substrate's surface. These hydrophilic layers are easy to clean, scratch resistant, acid and base resistant, oil resistant and are not limited to use in any particular field but can be practiced in any area where the properties of the metal oxide layers are useful in many applications.

As stated before, the layers also have anti fogging-capabilities. This is also believed to be due to its super-hydrophilic nature. The nanoparticles in the coating strongly attract the water droplets and force them to form much smaller contact angles with the surface. As a result, the droplets flatten and merge into a uniform, transparent sheet rather than forming countless individual light-scattering spheres. It is believed that this effect causes water hitting or forming on the surfaces to develop a sustained sheeting effect preventing fogging.

The layers also offer unique benefits in protecting coated substrates from being degraded by UV radiation. Especially ZnO, currently widely used in cosmetic applications for sun screens, can add value to various types of coatings with respect to interior and exterior photo degradation.

The layer, or layers, of the present invention can be very thin. For example, one embodiment of the invention provides a hydrophilic film that is from about 20 to about 100 nm thick, for example, from about 20 and about 80 or about 60 nm thick. In one particular embodiment, the outermost layer of a composite substrate coated by the process of the invention has a thickness of from 60-70 nm.

While thin, the layers of the invention retain their properties over long periods of time, even under outdoor weathering conditions. This retention of properties includes the permanence of hydrophilicity over a plurality of cleaning cycles.

EXAMPLES

General Procedure A

A substrate is first dipped into a 0.3% Polyallylamine solution for 45 minutes at 20° C., then removed from the solution, excess solution is then removed from the glass surface by touching the end of the glass to a paper towel, and the thus coated slide is dipped into a suspension of metal oxide nanoparticles for 45 minutes. The substrate is removed from the suspension, excess liquid is removed by again touching the end of the substrate to a paper towel and the substrate is then placed into a 0.3% glutaric aldehyde solution for 16 hours. The coated substrate is removed, dried in an oven at 80° C. for 1 hour then calcinated in a furnace at 475° C. for 4 hours.

General Procedure A'

Procedure A is followed except that after the substrate is treated with glutaric anhydride and dried, but before calcination, the substrate is dipped into a second metal oxide nano particle suspension for 45 minutes. The substrate is then removed from the second suspension, the excess liquid is removed as above and calcined as above.

Example 1

Glass Substrate Coated with a Layer Derived from $SiO_2$ Nanoparticles

A glass microscope slide is treated with a 0.3% polyallylamine solution, a 0.3% sol suspension of $SiO_2$ prepared by diluting LUDOX TMA, a 34 wt % nanoparticle suspension of colloidal $SiO_2$ in water (obtained from SIGMA-ALDRICH) and a 0.3% glutaric aldehyde solution then dried and calcined according to General Procedure A.

Example 2

Glass Substrate Coated with a Layer Derived from $TiO_2$ Nanoparticles

A glass microscope slide is treated with a 0.3% polyallylamine solution, a suspension of $TiO_2$ prepared by diluting a known weight % of a $TiO_2$ nanoparticle suspension and a 0.3% glutaric aldehyde solution then dried and calcined according to General Procedure A.

Example 3

Glass Substrate Coated with a Single Layer Derived from Mixed Metal Oxide Nanoparticles A glass microscope slide is treated with a 0.3% polyallylamine solution, a mixed nano particle suspension prepared by mixing a known amount of a known weight % of ZnO, $TiO_2$, and $SiO_2$ nanoparticle suspensions, and diluting them to the desired overall weight percent, and a 0.3% glutaric aldehyde solution then dried and calcined according to General Procedure A.

Example 4

Glass Substrate Coated with a Dual Metal Oxide Layer Derived from $SiO_2$ Nanoparticles and $TiO_2$ Nanoparticles Following General Procedure A', a glass microscope slide is treated with a 0.3% polyallylamine solution, the 0.3% sol suspension of $SiO_2$ of Example 1, a 0.3% glutaric anhydride solution, the suspension of $TiO_2$ of Example 2, then calcined.

Example 5

Glass Substrate Coated with a Dual Metal Oxide Layer Derived from $SiO_2$ Nanoparticles and ZnO Nanoparticles Following General Procedure A', a glass microscope slide is treated with a 0.3% polyallylamine solution, the 0.3% sol suspension of $SiO_2$ of Example 1, a 0.3% glutaric anhydride solution, a suspension of $ZnO_2$ then calcined.

Example 6

Ceramic Substrate Coated with a Layer Derived from $SiO_2$ Nanoparticles

A ceramic substrate is treated with a 0.3% polyallylamine solution, the 0.3% sol suspension of $SiO_2$ of Example 1, and a 0.3% glutaric aldehyde solution then dried and calcined according to General Procedure A.

General Preparation Procedure B

A Polyallylamine solution is sprayed onto a substrate for 1 minute and the thus coated substrate is dried for 1 minute with an air knife. A suspension of metal oxide nano particles is then sprayed onto the coated substrate followed by drying for 1 minute with an air knife, after which a glutaric aldehyde solution is sprayed onto the substrate for 1 minute and dried and the coated substrate is calcined in a furnace at 475° C. for 4 hours.

Example 7

Glass Substrate Coated with a Layer Derived from $SiO_2$ Nanoparticles

A 0.3% polyallylamine solution, the 0.3% sol suspension of $SiO_2$ of Example 1, and a 0.3% glutaric aldehyde solution are sprayed onto a glass microscope slide and dried and calcined according to General Procedure B.

Example 8

Glass Substrate Coated with a Layer Derived from SiO$_2$ Nanoparticles

A glass microscope slide is treated according to the procedure of Example 1 except that the slide is first dipped into a 0.5% of amino-agar solution instead of the 0.3% Polyallylamine solution followed by dipping in the 0.3% sol suspension of SiO$_2$, dipping in the 0.3% glutaric aldehyde solution, drying and calcining.

Example 9

Glass Substrate Coated with a Layer Derived from SiO$_2$ Nanoparticles

A glass microscope slide is treated according to the procedure of Example 1 except that the slide is first dipped into a 0.5% of polylysine solution instead of the 0.3% Polyallylamine solution followed by dipping in the 0.3% sol suspension of SiO$_2$, dipping in the 0.3% glutaric aldehyde solution, drying and calcining.

Example 10

Glass Substrate Coated with a Dual Metal Oxide Layer Derived from SiO$_2$ Nanoparticles and TiO$_2$ Nano Particles Prepared by Micro Emulsion Micro Emulsion Process:

To a 500 ml of cyclohexane is added 0.2M of TRITON X-100, a commercial surfactant comprising t-octylphenoxypolyethoxyethanol, and 0.4M of water and the mixture is moderately agitated with a magnetic stirrer for 20 minutes after which time 0.2M of titanium isopropoxide is slowly added and the resulting mixture agitated for an additional 30 minutes to obtain a suspension/emulsion of TiO$_2$ nano particles.

A glass microscope coated with a layer derived from SiO$_2$ nanoparticles and calcined according to Example 1 is dipped into a recently agitated suspension/emulsion of TiO$_2$ nano particles prepared according to the micro emulsion process above for 60 seconds. The substrate is then drawn from the emulsion at a slow steady rate then calcined at 450° C. for 20 minutes.

Example 11

Deposition of a Dual Layer by TiO2 Micro Emulsion, Single Calcination

A glass microscope slide is dipped into a 0.3% polyallylamine solution for 45 minutes, the slide is then removed from the solution, the excess solution is removed from the glass surface by touching the end of the glass to a paper towel, and the thus coated slide is dipped into the 0.3% sol suspension of SiO2 of Example 1 for 45 minutes. The slide is then removed from the suspension, the excess liquid is removed from the surface by touching the end of the glass slide to a paper towel, and the thus coated slide is then placed into a 0.3% glutaric dialdehyde solution for 16 hours. The coated slide is not calcined at this stage but dipped into a recently agitated suspension/emulsion of TiO$_2$ nano particles prepared according to the micro emulsion process of Example 10 for 60 seconds. The substrate is then drawn from the emulsion at a slow steady rate then calcinated at 475° C. for 4 hours.

Example 12

TGA Analyses

The polyallylamine and amino-agar polymers of Examples 1-11 are evaluated by using thermo-gravimetric analysis to determine the % of organic residue which may be left after calcination process using a TGA Q500 at a scan rate of 10° C./min in air and the results are shown in the table below. Chitosan, a linear polysaccharide composed of randomly distributed β-(1-4)-linked D-glucosamine (deacetylated unit) and N-acetyl-D-glucosamine (acetylated unit), is a possible substitute for the polyamine or amino-agar in the above examples and of Examples 1-11 and is also evaluated using thermo-gravimetric analysis.

TGA RESULTS: TGA scans (10° C./min to 600° C., 100 ml/min Air, Pt pans, ≈10 mg)

| Sample ID | Temperature for % wt loss, (° C.) | | |
|---|---|---|---|
| | 2% | 10% | 50% |
| Amino-Agar | 46 | 84 | 305 |
| Chitosan | 37 | 82 | 322 |
| Poly allyl amine | 38 | 57 | 94 |

| Sample ID | Wt. loss | Temperature Range, (° C.) | Assignment |
|---|---|---|---|
| Amino-Agar | 15.9% | 27°-200° C. | Volatiles |
| | 55.4% | 200°-390° C. | Decomp. |
| | 27.6% | 390°-575° C. | Decomp. |
| Chitosan | 11.8% | 29°-160° C. | Volatiles |
| | 50.2% | 160°-390° C. | Decomp. |
| | 36.3% | 390°-600° C. | Decomp. |
| | 1.7% | >600° C. | Residue |
| Polyallylamine | 76.6% | 30° C.-225° C. | Volatiles |
| | 23.0% | 225° C.-575° C. | Decomp. |

Example 13

Surface Imaging

The immobilized monolayer from calcination of the silicon dioxide precursor coating produced according to Example 1 and Example 6 are examined using SEM and AFM microscopy. The surface of each sample exhibited a smooth surface at the nanoscale.

Further examination of AFM and 3D images of silica (silicon dioxide) coated glass substrates produced according to the examples, e.g. example 1, showed a thin nano-silica layer deposited on the glass surface, having a thickness of ~60 nm with 40-70 nm particle size. In some areas two layers are observed, but most of the surface is covered with a loose mono-layer of slightly agglomerated silica particles.

Further examination of the images of silica (silicon dioxide) coated ceramic substrates produced according to the examples, e.g. example 6, showed a thin nano-silica layer deposited on the glass surface, having a thickness of ~75 nm with 40-70 nm particle size. In some areas two layers are observed, slightly more than observed on the glass slide, but most of the surface is covered with a loose mono-layer of almost no agglomerated but single individual silica particles.

Examples 14-20

Performance Characteristics

Certain performance characteristics, durability, solvent resistance, resistance to acids and bases and dirt resistance of coated substrates made according to the previous examples are tested using well known and accepted techniques. The uncoated glass and ceramic samples below are calcined under the same conditions as the coated samples prior to testing. Contact angles values in the tables below are measured in degrees.

Example 14

Durability

Coated substrates are prepared according to Examples 1, 4, 5 and 6 and the wettability, or hydrophilicity, is measured by water contact angle using conventional, well known procedures, after from 1 to 30 days storage under ambient conditions. The comparative uncoated glass is subjected to calcining conditions prior to the test and displays the temporary effects of calcining which effects are maintained in the coated samples.

| | Water Contact Angle | | | | |
|---|---|---|---|---|---|
| Substrate | 24 hrs | 3 days | 5 days | 10 days | >3 months |
| Uncoated glass (calcined) | ~1 | 35 | 35 | 35 | 35 |
| Ex-1, Glass/Nano-SiO2 | 0 | ~1 | ~1 | ~1 | ~3 |
| Ex-4, Glass/Nano-SiO2-TiO2 | 0 | ~1 | ~1 | ~3 | ~5 |
| Ex-5, Glass/Nano-SiO2-ZnO | 0 | ~1 | ~1 | 1 | ~5-7 |
| Ex-6, Ceramic/Nano-SiO2 | ~3 | ~3 | ~3 | ~5 | ~5-7 |

Example 15

Contact Angle of Vegetable Oil

The contact angle of certain vegetable oil drops is measured on the following substrates:

| | Contact Angle | | |
|---|---|---|---|
| Substrate | Olive oil | Sunflower oil | Corn oil |
| Uncoated Glass | 28 | 33 | 21 |
| Ex-1, Nano-Silica/Glass | 6 | 5 | 6 |
| Uncoated Ceramic | 19 | 27 | 30 |
| Ex-6, Nano-silica/Ceramic | 12 | 8 | 5 |

Example 16

Mechanical Stability/Ultrasonic Washing (USW)

The water contact angle is measured on coated substrates prepared according to Examples 1 and 6 both before and after exposure to X minutes of ultrasonic washing (USW). The results are shown in the table below and show little change for the coated glass substrate.

| | Water Contact Angle After X minutes USW | | | |
|---|---|---|---|---|
| Substrate | 0 min | After 5 min | After 20 min | After 40 min |
| Ex-1, Nano-silica/glass | 5-7 | 15-16 | — | 15 |
| Ex-6, Nano-silica/Ceramic | ~4-5 | 31-33 | 16-22 | 30 |

Example 17

Acid Resistance

Coated substrates prepared according to Examples 1 and 6 are immersed in aqueous acid solutions shown below for approximately 15 minutes, then removed and allowed to dry. The water contact angle is measured for each sample before and after the acid treatment. The results are shown in the table below and show little change for either coated substrate.

| | Water Contact Angle | | | |
|---|---|---|---|---|
| Substrate | Initial | pH 3.5 | pH 1 | 1N HCl |
| Ex-1, Nano-silica/Glass | 9 | 9 | 9 | 12 |
| Ex-6, Nano-silica/Ceramic | ~5 | ~5 | ~5 | 6 |

Example 18

Base Resistance

Coated substrates prepared according to Examples 1 and 6 are immersed in aqueous base solutions shown below for approximately 15 minutes, then removed and allowed to dry. The water contact angle is measured for each sample before and after the base treatment. The results are shown in the table below and show little change for either coated substrate.

| | Water Contact Angle | | | |
|---|---|---|---|---|
| Substrate | Initial | pH 10 | pH 12 | 1N NaOH |
| Ex-1, Nano-silica/Glass | 9 | 6 | 7 | 8 |
| Ex-6, Nano-silica/Ceramic | ~5 | 7 | 8 | 8 |

Example 19

Organic Solvent Resistance

Coated substrates prepared according to Example 1 are immersed in acetone and methanol for approximately 15 minutes, then removed and allowed to dry. The water contact angle is measured for each sample before and after the solvent treatment. The results are shown in the table below.

| Substrate | Water Contact Angle | | |
|---|---|---|---|
| | Initial | Acetone | Methanol |
| Ex-1, Nano-silica/Glass | 9 | 13 | 20 |

Example 20

Dirt Resistance

The surface of the metal oxide coated substrates of the invention and untreated substrates are contaminated with powder contaminants and soap scum and subjected to mild cleaning conditions. The glass and ceramic coated substrates of the invention are easy to clean. In each case, powder and soap scum are removed much more readily from the coated substrates than from the non-coated substrates.

What is claimed is:

1. A method for preparing a superhydrophilic layer comprising one or more metal oxides on a substrate which method comprises:
    (a) first coating the substrate with a cationic polymer, followed by
    (b) applying to the substrate coated by the cationic polymer a suspension, in a solvent, of amorphous particles of one or more metal oxides selected from the group consisting of oxides of silicon, zinc and titanium, wherein the particles have a particle diameter of from about 20 nm to about 80 nm, to form a single layer film;
    (c) cross linking the thus obtained single layer film by applying a cross linking agent followed by drying to obtain a precursor film; and then
    (d) calcining the precursor film at temperatures ranging from about 400° C. to about 600° C. for about 1 to 8 hours.

2. A method for preparing a superhydrophilic layer according to claim 1, wherein
    in (a) the cationic polymer is a polyamine, or a positively charged polysaccharide which polymer is applied to the substrate as part of a solution in a solvent,
    in (b) the particles of one or more metal oxides is selected from the group consisting of oxides of $SiO_2$, ZnO, rutile $TiO_2$ and anatase $TiO_2$,
    in (c) the cross linking agent is a dialdehyde, and
    in (d) the precursor film is calcined by heating at temperatures of from about 400° C. to about 600° C. for about 1 to 8 hours.

3. A method for preparing a superhydrophilic layer according to claim 1, wherein in (a) the polyamine is selected from polyallyl amine and polyethylenimmine and the positively charged polysaccharide is selected from polylysine, an amino-agar, and chitosan.

4. A method for preparing a superhydrophilic layer according to claim 1, wherein in (c) the cross linking agent is gluteraldehyde.

5. A method for preparing a superhydrophilic layer according to claim 1, wherein the precursor film is calcined by heating at temperatures of from about 400° C. to about 500° C. for about 2-6 hours.

6. A method for preparing a superhydrophilic layer according to claim 1, wherein the precursor film is calcined at temperatures below the softening point of the precursor film.

7. A method for preparing a superhydrophilic layer according to claim 1, wherein in b) the suspension contains two or more different metal oxides.

8. A method for preparing a superhydrophilic layer according to claim 1, wherein two different suspensions of metal oxides are applied separately.

9. A method for preparing a superhydrophilic layer on a metal, thermally stable plastic, glass or ceramic substrate according to claim 1.

10. A method for preparing a superhydrophilic layer according to claim 9, wherein the substrate is glass or ceramic.

11. The method according to claim 1, wherein the solvent is water, alcohols, glycols, esters, ethers, ketones, amides, hydrocarbons, aromatic solvent or halogenated solvents.

* * * * *